United States Patent

Yanus et al.

[11] Patent Number: 5,356,743
[45] Date of Patent: Oct. 18, 1994

[54] ELECTROPHOTOGRAPHIC IMAGING MEMBERS CONTAINING POLYARYLAMINE POLYESTERS

[75] Inventors: John F. Yanus, Webster; William W. Limburg, Penfield; Dale S. Renfer, Webster, all of N.Y.

[73] Assignee: Xerox Corporation, Stamford, Conn.

[21] Appl. No.: 148,818

[22] Filed: Nov. 8, 1993

Related U.S. Application Data

[63] Continuation-in-part of Ser. No. 798,308, Nov. 25, 1991, abandoned.

[51] Int. Cl.$^5$ .................. G03G 5/047; G03G 5/09
[52] U.S. Cl. ........................... 430/59; 430/83
[58] Field of Search .............. 430/59, 66, 67, 96, 430/83

[56] References Cited

U.S. PATENT DOCUMENTS

| | | | |
|---|---|---|---|
| 3,844,781 | 10/1974 | Tsuchiya et al. | |
| 3,890,146 | 6/1975 | Nagashima et al. | |
| 4,047,948 | 9/1977 | Horgan | 430/58 |
| 4,052,205 | 10/1977 | Stolka et al. | 252/501.1 |
| 4,265,990 | 5/1981 | Stolka et al. | 430/59 |
| 4,273,846 | 6/1981 | Pai et al. | 430/59 |
| 4,346,158 | 8/1982 | Pai et al. | 430/59 |
| 4,388,392 | 6/1983 | Kato et al. | 430/58 |
| 4,415,641 | 11/1983 | Soto et al. | 430/59 |
| 4,588,666 | 5/1986 | Stolka et al. | 430/59 |
| 4,588,667 | 5/1986 | Jones et al. | 430/73 |
| 4,801,517 | 1/1989 | Frechet et al. | 430/59 |
| 4,806,443 | 2/1989 | Yanus et al. | 430/56 |
| 4,806,444 | 2/1989 | Yanus et al. | 430/56 |
| 4,818,650 | 4/1989 | Lemburg et al. | 430/56 |
| 4,983,482 | 1/1991 | Ong et al. | 430/59 |
| 5,034,296 | 7/1991 | Ong et al. | 430/59 |
| 5,262,512 | 11/1993 | Yanus et al. | 430/59 X |

FOREIGN PATENT DOCUMENTS

| | | |
|---|---|---|
| 1171431 | 7/1984 | Canada . |
| 0295125A2 | 12/1988 | European Pat. Off. . |
| 0396376 | 7/1990 | European Pat. Off. . |

OTHER PUBLICATIONS

Stolka et al., Photoconductivity and Hole Transport in Polymers of Aromatic Amine–Containing Methacrylates, Journal of Polymer Science: Polymer Chemistry Edition vol. 21, 969(1983).

Primary Examiner—Roland Martin

[57] ABSTRACT

An electrophotographic imaging member including a support layer and at least one electrophotoconductive layer, the imaging member comprising a polyarylamine polymer represented by the following formula:

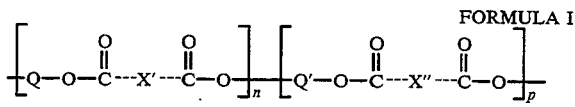

FORMULA I wherein:

n is between about 5 and about 5,000
p is between about 0 and about 5,000
X' and X" are independently selected from a group having bifunctional linkages,
Q is a divalent group derived from certain hydroxy terminated arylamine reactants, and
Q' is a divalent group derived from a hydroxy terminated group.

This imaging member is used in an electrophotographic imaging process.

18 Claims, No Drawings

ELECTROPHOTOGRAPHIC IMAGING MEMBERS CONTAINING POLYARYLAMINE POLYESTERS

This application is a Continuation-In-Part of U.S. patent application Ser. No. 07/798,308, filed Nov. 25, 1991.

BACKGROUND OF THE INVENTION

This invention relates in general to electrophotographic imaging systems and, more specifically, to electrophotographic imaging members and processes utilizing polymeric tertiary arylamine compounds.

In the art of electrophotography an electrophotographic plate comprising a photoconductive insulating layer on a conductive layer is imaged by first uniformly electrostatically charging the surface of the photoconductive insulating layer. The plate is then exposed to a pattern of activating electromagnetic radiation such as light, which selectively dissipates the charge in the illuminated areas of the photoconductive insulating layer while leaving behind an electrostatic latent image in the non-illuminated areas. This electrostatic latent image may then be developed to form a visible image by depositing finely divided electroscopic toner particles on the surface of the photoconductive insulating layer. These toner particles may be applied to the surface in dry form or dispersed in a liquid carrier medium. The resulting visible toner image can be transferred to a suitable receiving member such as paper. This imaging process may be repeated many times with reusable photoconductive insulating layers.

As more advanced, higher speed electrophotographic copiers, duplicators and printers were developed, degradation of image quality was encountered during cycling. Moreover, complex, highly sophisticated, duplicating and printing systems operating at high speeds have placed stringent requirements including narrow operating limits on photoreceptors. For example, the numerous layers found in many modern photoconductive imaging members must be highly flexible, adhere well to to adjacent layers, be mechanically compatible with other flexible photoreceptor belt components, and exhibit predictable electrical characteristics within narrow operating limits to provide excellent toner images over many thousands of cycles. There is also a great current need for long service life, flexible photoreceptors in compact imaging machines that employ small diameter support rollers for photoreceptor belt systems compressed into a very confined space. Small diameter support rollers are also highly desirable for simple, reliable copy paper stripping systems which utilize the beam strength of the copy paper to automatically remove copy paper sheets from the surface of a photoreceptor belt after toner image transfer. However, small diameter rollers, e.g less than about 0.75 inch (19 mm) diameter, raise the threshold of mechanical performance criteria for photoreceptors to such a high level that spontaneous photoreceptor belt material failure becomes a frequent event for flexible belt photoreceptors.

One type of multilayered photoreceptor that has been employed as a belt in electrophotographic imaging systems comprises a substrate, a conductive layer, a charge blocking layer a charge generating layer, and a charge transport layer. The charge transport layer often comprises an activating small molecule dispersed or dissolved in a polymeric film forming binder. Generally, the polymeric film forming binder in the transport layer is electrically inactive by itself and becomes electrically active when it contains the activating molecule. The expression "electrically active" means that the material is capable of supporting the injection of photogenerated charge carriers from the material in the charge generating layer and is capable of allowing the transport of these charge carriers through the electrically active layer in order to discharge a surface charge on the active layer. The multilayered type of photoreceptor may also comprise additional layers such as an anti-curl backing layer, required when layers possess different coefficient of thermal expansion values, an adhesive layer, and an overcoating layer. Commercial high quality photoreceptors have been produced which utilize an anti-curl coating. It is desirable, however, to eliminate this layer. The elimination of this layer would remove a process step, resulting in material savings, processing time savings, and an increasing yield due to the decrease in handling. In addition the presence of an anticurl back coating greatly increases the stress at the upper surface of the photoreceptor which can result in an increased propensity to cracking and crazing during the flexing experienced during use. Although excellent toner images may be obtained with multilayered belt photoreceptors that are developed with dry developer powder (toner), it has been found that these same photoreceptors become unstable when employed with liquid development systems. These photoreceptors suffer from cracking, crazing, crystallization of active compounds, phase separation of activating compounds and extraction of activating compounds caused by contact with the organic carrier fluid, isoparaffinic hydrocarbons e.g. Isopar ®, commonly employed in liquid developer inks which, in turn, markedly degrade the mechanical integrity and electrical properties of the photoreceptor. More specifically, the organic carrier fluid of a liquid developer tends to leach out activating small molecules, such as the arylamine containing compounds typically used in the charge transport layers. Representative of this class of materials are: N,N'-diphenyl-N,N'-bis(3-methylphenyl)-[1,1'-biphenyl]-4,4'-diamine; bis-(4-diethylamino-2-methylphenyl)-phenylmethane; 2,5-bis-(4'-dimethylaminophenyl)-1,3,4,-oxadiazole; 1-phenyl-3-(4'-diethylaminostyryl)-5-(4''-diethylaminophenyl)-pyrazoline; 1,1-bis-(4-(di-N,N'-p-methylphenyl)-aminophenyl)-cyclohexane; 4-diethylaminobenzaldehyde-1,1-diphenylhydrazone; 1,1-diphenyl-2(p-N,N-diphenyl amino phenyl)-ethylene; N-ethylcarbazole-3-carboxaldehyde-1-methyl-1-phenylhydrazone. The leaching process results in crystallization of the activating small molecules, such as the aforementioned arylamine compounds, onto the photoreceptor surface and subsequent migration of arylamines into the liquid developer ink. In addition, the ink vehicle, typically a $C_{10}$–$C_{14}$ branched hydrocarbon, induces the formation of cracks and crazes in the photoreceptor surface. These effects lead to copy defects and shortened photoreceptor life. The degradation of the photoreceptor manifests itself as increased background and other printing defects prior to complete physical photoreceptor failure.

The leaching out of the activating small molecule also increases the susceptibility of the transport layer to solvent/stress cracking when the belt is parked over a belt support roller during periods of non-use. Some carrier fluids also promote phase separation of the activating small molecules, such as arylamine compounds and their aforementioned derivatives, in the transport layers, particularly when high concentrations of the arylamine compounds are present in the transport layer binder. Phase separation of activating small molecules also adversely alters the electrical and mechanical properties of a photoreceptor. The leachant, the hole transporting molecule, may also contaminate the liquid ink lowering the overall print quality. Although flexing is normally not encountered with rigid, cylindrical, multilayered photoreceptors which utilize charge transport layers containing activating small molecules dispersed or dissolved in a polymeric film forming binder, electrical degradation is similarly encountered during development with liquid developers. Sufficient degradation of these photoreceptors by liquid developers can occur in less than eight hours of use thereby rendering the photoreceptor unsuitable for even low quality xerographic imaging purposes.

Photoreceptors have been developed which comprise charge transfer complexes prepared with polymeric molecules. For example, charge transport complexes formed with polyvinyl carbazole are disclosed in U.S. Pat. No. 4,047,948, U.S. Pat. No. 4,346,158 and U.S. Pat. No. 4,388,392. Photoreceptors utilizing polyvinyl carbazole layers, as compared with current photoreceptor requirements, exhibit relatively poor xerographic performance in both electrical and mechanical properties. Polymeric arylamine molecules prepared from the condensation of di-secondary amine with a di-iodo aryl compound are disclosed in European patent publication 34,425, published Aug. 26, 1981 and issued May 16, 1984. Since these polymers are extremely brittle and form films which are very susceptible to physical damage, their use in a flexible belt configuration is precluded. Thus, in advanced imaging systems utilizing multilayered belt photoreceptors exposed to liquid development systems, cracking and crazing have been encountered in critical charge transport layers during belt cycling. Cracks developing in charge transport layers during cycling can be manifested as print-out defects adversely affecting copy quality. Furthermore, cracks in the photoreceptor pick up toner particles which cannot be removed in the cleaning step and may be transferred to the background in subsequent prints. In addition, crack areas are subject to delamination when contacted with blade cleaning devices thus limiting the options in electrophotographic product design. It should also be noted that the presence of an anti-curl back coating will exacerbate the propagation of cracks in brittle polymers.

Photoreceptors having charge transport layers containing small molecule arylamine compounds dispersed or dissolved in various resins such as polycarbonates are known in the art. Similarly, photoreceptors utilizing polymeric arylamine containing molecules such as polyvinyl carbazole and polymethacrylates possessing pendant arylamines are also known. Further, condensation polymers of a di-secondary amine with a di-iodo aryl compound are described in the prior art. Moreover, various polymers derived from a reaction of certain to ohomers with aromatic amines such as N,N'-diphenyl-N,N'-bis(3-hydroxyphenyl)-[1,1'-biphenyl]-4,4'-diamine have recently been described.

Recently photoreceptors having charge transport layers containing charge transporting arylamine polymers have been described in the patent literature. These polymers include the products of a reaction involving a dihydroxy arylamine reactant and are described, for example in U.S. Pat. No. 4,806,443, U.S. Pat. No. 4,806,443, U.S. Pat. No. 4,801,517 and U.S. Pat. No. 4,818,650, the entire disclosures of these patents being incorporated herein by reference. Although these polymers form excellent charge transport layers, many other polymeric derivatives of dihydroxy arylamines do not meet the numerous stringent requirements of sophisticated automatic electrophotographic systems. For example, the polymeric reaction products of dihydroxy arylamines and 1,3-diiodopropane form charge transport layers that possess very poor mechanical properties, are soft and non-robust and are of low molecular weight.

INFORMATION DISCLOSURE STATEMENT

U.S. Pat. No. 4,806,443 to Yanus et al, issued Feb. 21, 1989—An electrostatographic imaging member is disclosed in which the imaging member comprises a substrate and an electroconductive layer, the imaging member comprising a polymeric arylamine compound represented by a specific formula shown in the abstract.

EP No. 295,125 A2 to Liraburg et al, published Dec. 14, 1988—A photoreceptor is disclosed containing arylamine compounds to facilitate the transport of electrical charge in and between component layer are rendered less susceptible to damage by liquid developers by using a hydroxy arylamine compound represented by a specific formula. Polymeric arylamine compounds having a specific formula is also disclosed.

U.S. Pat. No. 4,806,444 to Yanus et al, issued Feb. 21, 1989—An electrostatographic imaging member is disclosed in which the imaging member comprises a substrate and an electroconductive layer, the imaging member comprising a polymeric arylamine compound represented by a specific formula shown in the abstract.

U.S. Pat. No. 4,801,517 to Frechet et al, issued January 31, 1989—An electrostatographic imaging member is disclosed in which the imaging member comprises a substrate and at least one electroconductive layer, the imaging member comprising a polymeric amine compound represented by a specific formula shown in the abstract.

U.S. Pat. No. 4,818,650 to Liraburg et al, issued Apr. 4, 1989—An electrostatographic imaging member is disclosed in which the imaging member comprises a substrate and at least one electrophotoconductive layer, the imaging member comprising a polymeric arylamine compound represented by a specific formula shown in the abstract.

Canadian Patent 1,171,431 corresponds to European Patent Application 34,425 to Xerox, published Aug. 26, 1981, issued May 16, 1984. Condensation polymers of a di-secondary amine with a di-iodo aryl compound are described, for example, in working Examples [X and X.

Stolka et al, Photoconductivity and Hole Transport in Polymers of Aromatic Amine-Containing Methacrylates, Journal of Polymer Science: Polymer Chemistry Edition, Vol. 21,969 (1983)—Hole transport is described in high molecular weight arylamine-substituted polymethacrylates. Synthesis of the monomers, their polymerization, and the general properties of these polymers are also discussed.

U.S. Pat. No. 4,052,205 to Stolka et al, issued Oct. 4, 1977—A photoconductive imaging member is disclosed comprising various active polymers, such as poly-N-vinyl carbazole, in a transport layer, e.g line 45, column 5 to line 27, column 6. Derivatives of the active polymers may be hydroxy substituted, e.g. column 5, lines 62-65.

U.S. Pat. No. 5,034,296 to Ong et al, issued July 23, 1991—A layered photoresponsive imaging member is disclosed comprising a photogenerating layer, and in contact therewith a hole transporting layer comprised of fluorene charge transport polyesters represented by specific formulae.

U.S. Pat. No. 4,265,990 to Stolka et al, issued May 5, 1981—Transport layers are disclosed comprising small molecule arylamines and a polycarbonate resin binder.

U.S. Pat. No. 4,415,641 to Goto et al, issued Nov. 15, 1983—An electrophotographic light-sensitive element is disclosed comprising a carbazole derivative (see column 3, lines 1-14). $R_2$ can represent a hydroxy group.

U.S. Pat. No. 4,588,666 to Stolka et al, issued May 13, 1986—A hole transporting molecule is disclosed comprising alkoxy derivatives of tetra phenyl biphenyl diamine (see column 3, lines 33-66). $R_1$ and $R_2$ represent alkoxy groups which include methoxy. Resins such as polyvinyl carbazoles, polycarbonate resins, epoxy resins, polyvinyl butyrals, polyhydroxyether resins may be used as a binder for the hole transporting molecule.

U.S. Pat. No. 4,047,948 to A. M. Horgan, issued Sep. 13, 1977—A photoreceptor is disclosed comprising layers which may contain polyvinyl carbazole. The use of small molecule arylamine activating compounds in transport layers is also disclosed. The preferred small molecule resin binder is a polycarbonate resin.

U.S. Pat. No. 4,346,158 to Pal et al, issued Aug. 24, 1982—A photoreceptor is disclosed comprising layers which may contain polyvinyl carbazole. The use of small molecule arylamine activating compounds in transport layers is also disclosed. The preferred small molecule resin binder is a polycarbonate resin.

U.S. Pat. No. No. 4,388,392 to Kato et al, issued Jun. 14, 1987—A photoreceptor is disclosed comprising layers which may contain polyvinyl carbazole. The use of an electron-donating polycyclic aromatic hydrocarbon incorporated in an electron-donative polymeric photoconductor in a charge transporting layer is also disclosed.

U.S. Pat. No. 4,273,846 to Pal et al, issued Jun. 16, 1981—An imaging member is disclosed comprising a polycarbonate resin material and an arylamine (see the general formula, column 2, lines 21-34). Poly-N-vinyl carbazole may be employed in the generator layer.

U.S. Pat. No. 3,844,781 to Tsuchiya et al, issued Oct. 29, 1974—Various photoconductive materials are disclosed containing substituents such as hydroxyl, amino and alkoxy groups.

U.S. Pat. No. 3,890,146 to Nagashima et al, issued Jun. 17, 1975—Various photoconductive materials are disclosed containing substituents such as hydroxyl, amino and alkoxy groups.

U.S. Pat. No. 4,588,667 to Jones, issued May 13, 1986—Various overcoated electrophotographic imaging members are disclosed including a multilayered imaging member having a substrate, a titanium metal layer, a siloxane blocking layer, an adhesive layer, a charge generating binder layer, and a charge transport layer. The transport layer may contain from about 25 to about 75 percent by weight of arylamine transport material in a resin binder such as polycarbonate resin.

U.S. Pat. No. 4,983,482 to Ong et al, issued January 8, 1991—A photoresponsive imaging member is disclosed comprising a photogenerating layer and a hole transporting layer comprising a charge transport polyurethane having a specific formula.

EP 396,376 A1 to J. Melpolder, published Nov. 7, 1990—A polymerizable dye is disclosed in which the dye monomer is represented by a specific formula.

In copending U.S. patent application Ser. No. 07/627,338, filed on Dec. 14, 1990, now U.S. Pat. No. 5,149,609, in the names of R. Yu, J. Spiewak and D. nichol-Landry, an overcoated electrophotographic imaging member is disclosed in which the overcoating contains a polyester homopolymer which comprises a hole transport ester compound and an aliphatic diol in the polymer chain such as poly[oxydecamethyleneoxy-N,N'-diphenyl-N,N'bis(3-carbonylphenyl) benzidene.

In an application filed concurrently herewith on Nov. 25, 1991 in the names of John F. Yanus, William W. Liraburg and Dale S. Renfer, entitled POLYARYLAMINE POLYESTERS, U.S. patent application Ser. No. 07/797,642, now U.S. Pat. No. 5,262,512, a polyarylamine polymer is described which is employed in the imaging member of the instant invention.

Thus, there is a continuing need for multilayered photoreceptors having improved resistance to cracking, crazing, delamination, softening, swelling, crystallization of active compounds, phase separation of active compounds and leaching of active compounds. In addition to the ink compatibility requirements the active compounds in charge transport layers must also have high resistivity for charge retention, high hole mobility for rapid discharge, and mechanical toughness for long life. Further, there is a continuing need for multilayered photoreceptors having improved resistance to cracking, crazing, delamination, crystallization of active compounds, and phase separation of active compounds when used in dry development applications where life is limited by the lack of robustness of the multilayered photoreceptor. There also exists the need to better match the coefficient of thermal expansion of the supporting substrate in a flexible belt architecture to provide a stress free flat surface and eliminating the need for an anti-curl back coating.

SUMMARY OF THE INVENTION

It is, therefore, an object of the present invention to provide an improved polymeric tertiary arylamine compound containing photoresponsive members which overcome the above-noted disadvantages.

It is yet another object of the present invention to provide an improved electrophotographic member which exhibits greater resistance to cracking and crazing induced by liquid ink carrier fluid.

It is yet another object of the present invention to provide an improved electrophotographic member which exhibits greater resistance to cracking and crazing when mechanically cycled in a belt-type configuration around a narrow diameter roller.

It is a further object of the present invention to provide a photoconductive imaging member which exhibits improved resistance to component leaching during liquid development.

It is still another object of the present invention to provide a photoconductive imaging member which exhibits improved resistance to component crystallization during liquid development.

It is a further object of the present invention to provide a electrophotographic imaging member which retains stable electrical properties during cycling.

It is yet another object of the present invention to provide an improved electrophotographic member which resists abrasion and wear when exposed to blade cleaning devices and dry xerographic developers.

It is a further object of the present invention to provide an improved photoconductive imaging member which exhibits resistance to softening and swelling when exposed to liquid ink carrier fluid.

It is a further object of the present invention to provide an improved photoconductive imaging member in which internal stresses have been lessened by minimizing differences between the coefficient of thermal expansion of the various polymeric layers.

The foregoing objects and others are accomplished in accordance with this invention by providing an electrophotographic imaging member comprising a support layer and at least one electrophotoconductive layer, the imaging member comprising a polyarylamine polymer represented by formula I:

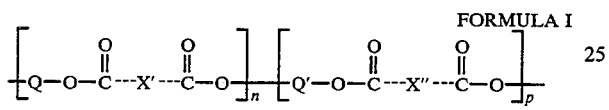

FORMULA I wherein:

n is between about 5 and about 5,000 p is between about 0 and about 5,000

X' and X" are a biradical independently selected from the group consisting of alkylene, arylene, substituted alkylene, substituted arylene and ether linkages represented by —R—O—R— where R is an alkylene moiety of 1–25 carbon atoms optionally interrupted by ether oxygens, Q is a divalent group derived from a hydroxy terminated arylamine reactant containing the group:

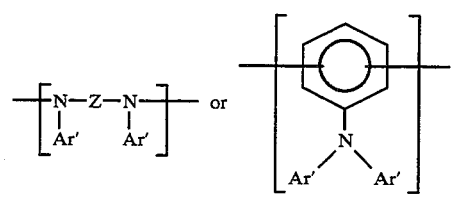

wherein:

Ar' is selected from the group consisting of:

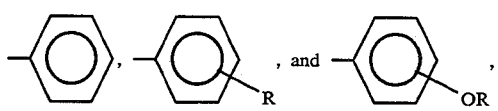

Z is selected from the group consisting of:

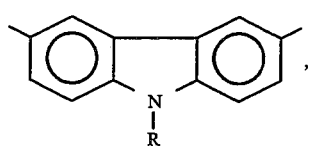

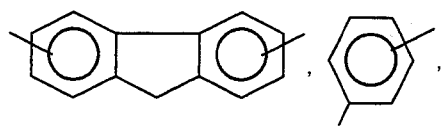

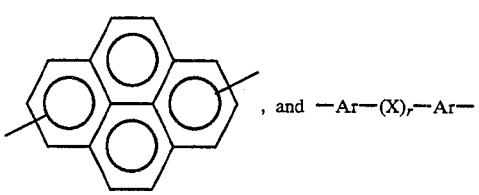

r is 0 or 1,

Ar is selected from the group consisting of:

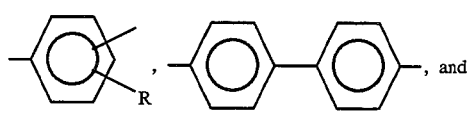

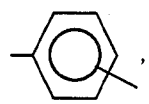

R is selected from the group consisting of —CH₃, —C₂H₅, —C₃H₇, and —C₄H₉,

X is selected from the group consisting of:

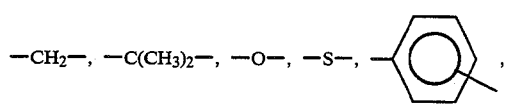

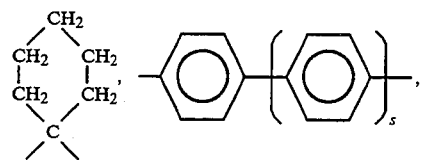

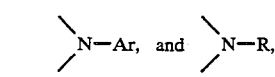

s is 0, 1 or 2

Q' is a divalent group derived from a hydroxy terminated group, and the weight average molecular weight of the polyarylamine polymer is between about 10,000 and about 1,000,000.

More preferably, the polyarylamine polymer is represented by the formula:

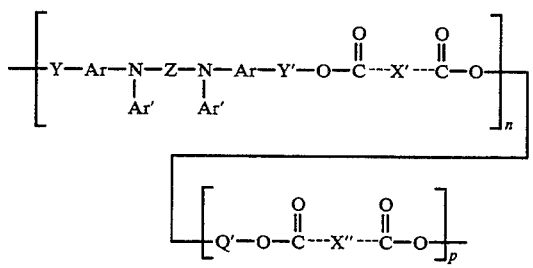

wherein:
n is between about 5 and about 5,000,
p is between about 0 and about 5,000,
Z is selected from the group consisting of:

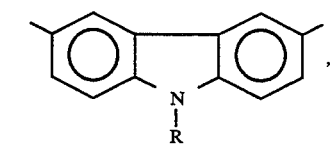

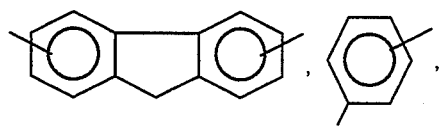

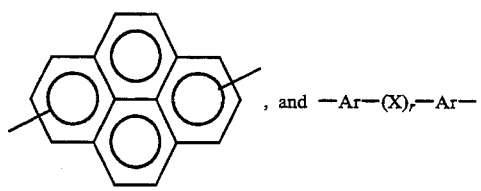

r is 0 or 1,
Ar is selected from the group consisting of:

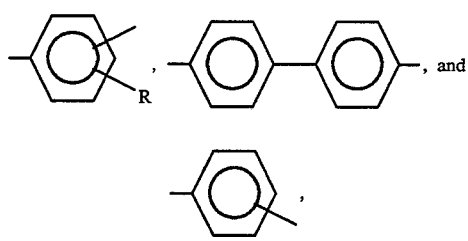

R is selected from the group consisting of —CH₃, —C₂H₅, —C₃H₇, and —C₄H₉,
X is selected from the group consisting of:

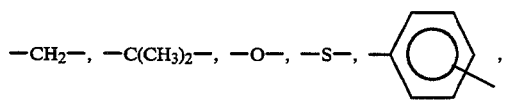

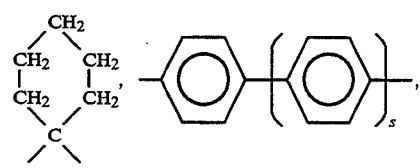

-continued

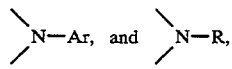

s is 0, 1 or 2,
Ar' is selected from the group consisting of:

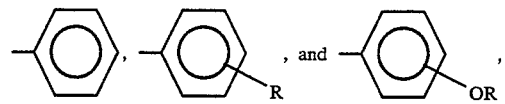

X' AND X" are a biradical independently selected from the group consisting of alkylene, arylene, substituted alkylene, substituted arylene and ether linkages represented by —R—O—R— where R is an alkylene moiety of 1-25 carbon atoms optionally interrupted by ether oxygens,
Y and Y' are independently selected from a group represented by the formula:

t is 0, 1, 2, 3, or 4, and
Q' is independently selected from the group having bifunctional linkages consisting of:

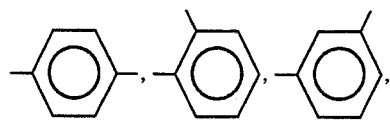

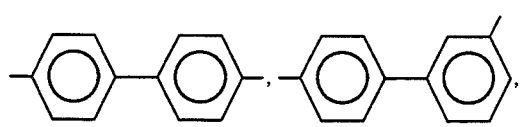

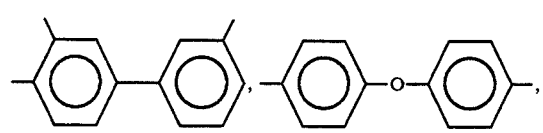

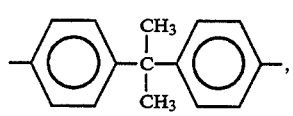

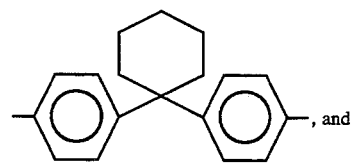

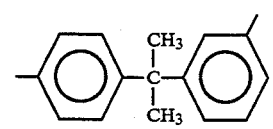

Generally, the polymeric arylamine compounds of this invention may be prepared by reacting a dihydroxy arylamine compound with a coreactant diacid chloride compound represented by the formula:

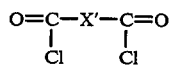

wherein X' is selected from the group consisting of biradicals independently selected from the group consisting of alkylene, arylene, substituted alkylene, substituted arylene and ether linkages represented by —R—O—R— where R is an alkylene moiety of 1–25 carbon atoms optionally interrupted by ether oxygens. Generally, the ether, alkylene and substituted alkylene bifunctional linkages contain from 1 to 25 carbon atoms. In addition a second diacid chloride compound is included in the reaction, the compound being represented by the formula:

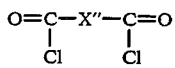

wherein X" is selected from the group consisting of biradicals independently selected from the group consisting of alkylene, arylene, substituted alkylene, substituted arylene and ether linkages represented by —R—O—R— where R is an alkylene moiety of 1–25 carbon atoms optionally interrupted by ether oxygens, and X" may be the same as X'.

Illustrative examples of substituted or unsubstituted alkylene groups include those containing from about 1 to about 25 carbon atoms, and preferably from 1 to about 10 carbon atoms, such as methylene, dimethylene, trimethylene, tetramethylene, 2,2-dimethyltrimethylene, pentamethylene, hexamethylene, heptamethylene, and the like.

Illustrative examples of substituted or unsubstituted arylene linkages include the following:

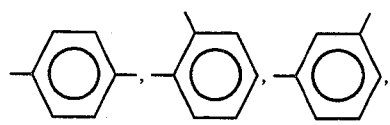

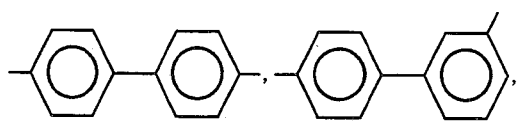

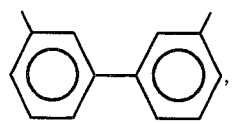

Examples of ether linkages represented by —R—O—R— where R is an alkylene moiety of 1–25 carbon atoms optionally interrupted by ether oxygens include those such as —CH₂OCH₂—, —CH₂CH₂—OCH₂CH₂—, —CH₂CH₂OCH₂—CH₂CH₂H₂OCH₂CH₂—, —CH₂CH₂—(OCH₂CH₂)₂—, —CH₂CH₂CH(CH₃)OCH₂CH₂—, and the like. Examples of alkyl substituents include those with from 1 to about 25 carbon atoms, such as methyl, ethyl, propyl, isopropyl, butyl, isobutyl, pentyl, 2-methylpentyl, hexyl, octyl, nonyl, decyl, and the like, with methyl, ethyl, propyl, and butyl being preferred. Aryl substituents include those with from 6 carbon atoms to about 24 carbon atoms, such as phenyl, tolyl, ethylphenyl, and naphthyl. The aryl groups can be substituted with alkoxy, hydroxy, halo, cyano, alkoxyalkyl, and the like.

Typical compounds represented by the above formula for the diacid chloride compound include:

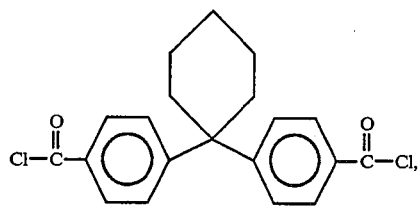

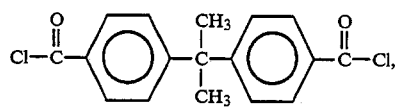

4,4'-diphenylisopropylidine diacidchloride

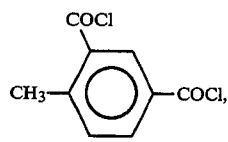

tolylene 2,4-diacid chloride

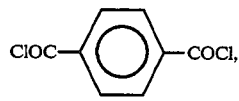

ClOC—CH₂—CH₂—CH₂—CH₂—CH₂—CH₂—COCl,

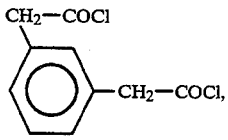

ClOC—(CH₂)₈—COCl,

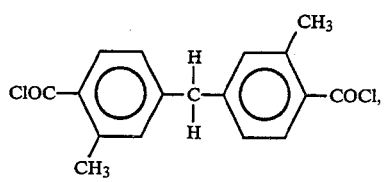

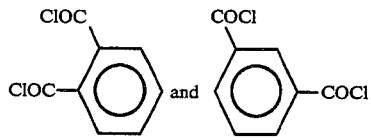

In one embodiment, polymeric arylamine compounds utilized in the imaging members of this invention may be prepared by reacting the diacid chloride compound with a dihydroxy arylamine compound represented by the formula:

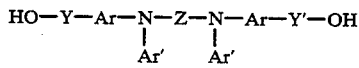

wherein:

Ar, Ar', Z, Y and Y' are as defined above.

Compounds represented by the above hydroxy arylamine formula may be prepared by hydrolyzing an alkoxy arylamine. A typical process for preparing alkoxy arylamines is disclosed in Example 1 of U.S. Pat. No. 4,588,666 to Stolka et al, the entire disclosure of this patent being incorporated herein by reference.

Typical compounds represented by the above formula for hydroxy arylamine compounds include:

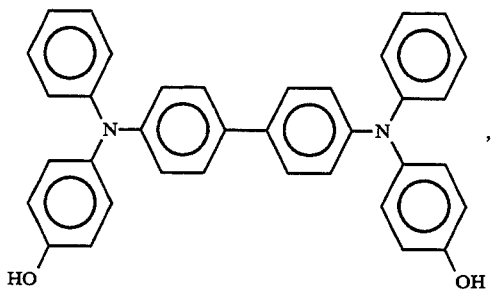

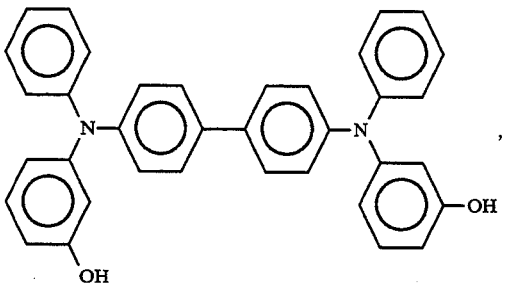

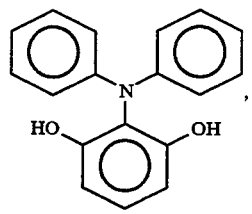

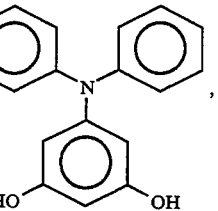

Compounds represented by the above hydroxy arylamine formula where t is 0, 1, 2, 3 or 4 may be prepared by reacting an arylamine compound having the formula:

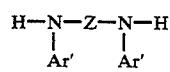

wherein: Z and Ar' are as defined above. Typical compounds represented by this formula include N,N'-diphenylbenzidine, N,N'-diphenyl-p-terphenyl diamine, N,N'-diphenyl-p,p'-diaminodiphenylether, N,N'-diphenyl-p,p'-cyclohexylidene diphenyldiamine, N,N'-diphenyl-p,p'-isopropylidene diphenyldiamine, N,N'-diphenyl-p,p'-methylidene diphenyldiamine, and the like. This arylamine compound is reacted with an iodobenzene compound such as m-bromoiodobenzene, m-chloroiodobenzene, p-chloroiodobenzene, p-bromoiodobenzene, and the like to form an intermediate product represented by the formula:

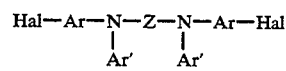

wherein: Z, Ar and Ar' are as defined above, Hal is bromine, chlorine or iodine. The bromine atoms in this intermediate product are thereafter replaced by lithium. The resulting dilithio arylamine compound is reacted with ethylene oxide, formaldehyde, oxatane, or tetrahydrofuran. This reaction is worked up in the presence of an aqueous acid to form a hydroxy alkylene arylamine precursor represented by the formula:

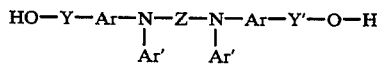

wherein: Z, Ar, Ar', Y, Y' are as defined above. This hydroxy alkylene arylamine precursor is then reacted with the co-reactant diacid chloride compound to form a polymeric arylamine of this invention.

The foregoing reactions are more specifically illustrated by the following reactions:

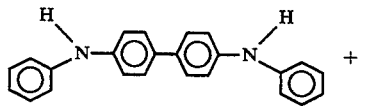

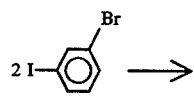

-continued

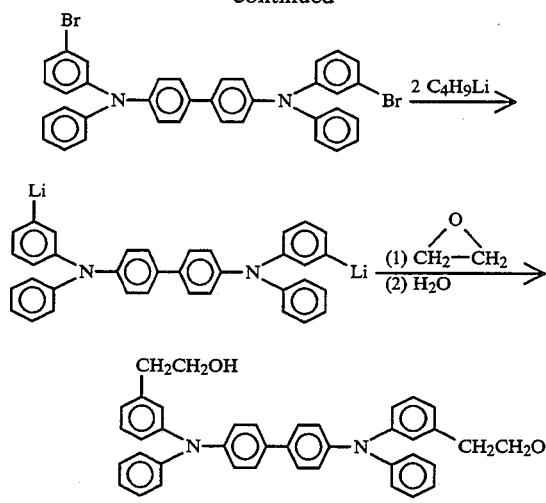

A typical process for preparing a hydroxy alkylene arylamine is disclosed in Examples II and III of U.S. Pat. No. 4,801,517, the entire disclosure of this patent being incorporated herein by reference.

Any suitable solvent may be employed to dissolve the reactants. Typical solvents include tetrahydrofuran, toluene, and the like. Satisfactory yields are achieved with reaction temperatures between about 0° C. and about 20° C. The reaction temperature selected depends to some extent on the specific reactants utilized and is limited by the temperature at which a cross linking side reaction may take place. The reaction temperature may be maintained by any suitable cooling technique.

The reaction time depends upon the reaction temperatures and the reactants used. Satisfactory results have been achieved with reaction times between about 40 minutes to about 90 minutes. For practical purposes, sufficient degree of polymerization is achieved by the time the reaction product layer is viscous.

One may readily determine whether sufficient reaction product has been formed by monitoring the increase in solution viscosity. An abrupt change in viscosity is noted as the polymerization is nearing completion. Typical polymeric arylamine compounds used in this invention include, for example:

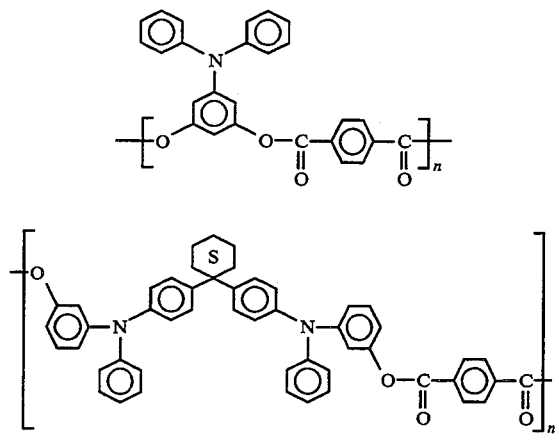

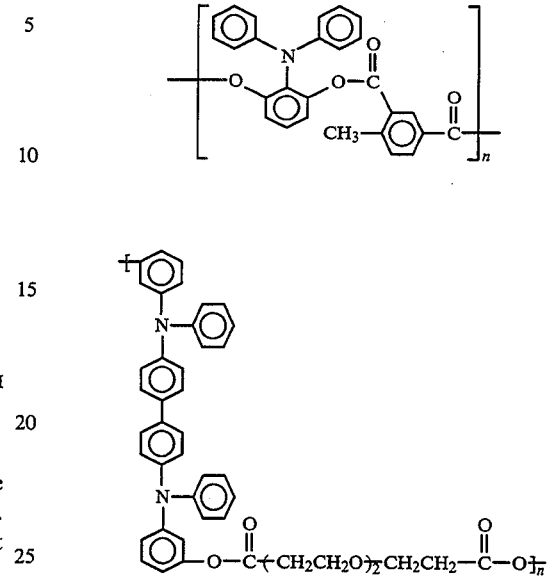

The "n" in the first appearing formula (FORMULA I) herein is defined as between about 5 and about 5,000. For the final polymers, "n" is defined as representing a number sufficient to achieve a weight average molecular weight of between about 20,000 and about 500,000 as represented in FORMULA I.

The following is an illustrative reaction between a specific diacid chloride compound and a specific dihydroxy arylamine compound:

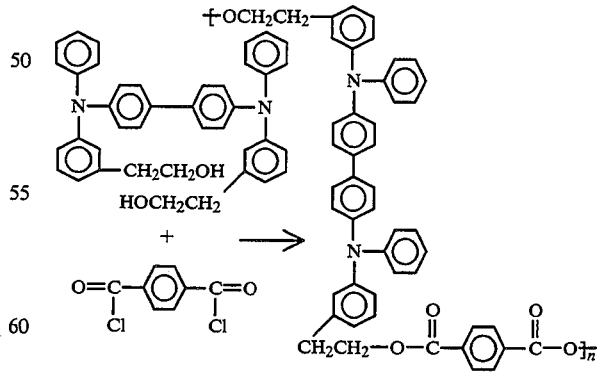

The following is still another illustrative reaction between another specific diacid chloride compound and a specific dihydroxy arylamine compound:

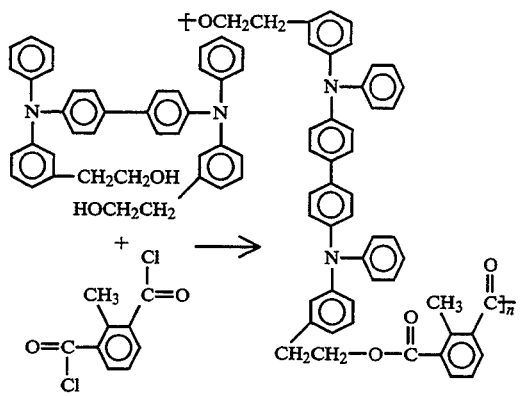

The following is an illustrative reaction between a preferred specific diacid chloride compound and a specific dihydroxy arylamine compound:

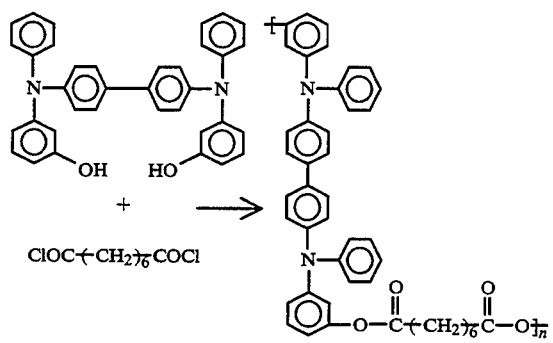

wherein the value of n was between about 40 and about 100. This polymer formed a viscous solution in tetrahydrofuran at a 10 percent by weight polymer concentration thereby further indicating that the material was a high molecular weight condensation polymer of between about 20,000 and about 500,000.

Multilayered photoconductive devices were fabricated with these polymers by applying methylene chloride solutions of the polymers to aluminum substrates bearing a 0.5 micrometer thick vapor deposited amorphous selenium layer. The deposited charge transport layers were then dried to a 15 micrometer thickness. These photoconductors were corona charged to a negative potential and thereafter discharged with a monochromatic light source of 4330 wavelength. These photoreceptor devices exhibited low dark decay, high mobility and low residual charge.

High hole mobility is a requirement for hole transporting materials to enable the rapid cycling characteristics of modern photoreceptors. Substituents on the transporting moiety should be such that an undesirable perturbation of the electronic environment, affecting its transporting ability, does not occur. Substituents that reduce mobility are those which withdraw electron density from the transporting moiety. Examples of these electronegative substituents include, $NO_2$, CN, $CF_3$, >C=O, etc. Transport polymers in which the connective linkage places an electronegative group in conjugation with the active transport moiety will exhibit poorer mobilities. For example, polymers of the type disclosed in the copending U.S. patent application Ser. No. 07/627,338, now U.S. Pat. No. 5,149,609, in which the carbonyl of the ester linkage is in conjugation with the transport moiety, results in a lower mobility material and hence restricting its use to a thin overcoating layer.

The arylamine transporting moieties of the polymers for the imaging members of this invention are rather rigid units, e.g. tetraphenylbenzidine, triphenylamine and they like. When incorporated in polymeric structures, this unit can be considered a rigid-rod unit (RRU). In condensation polymers, rigid-rod structures result in polymers of impaired flexibility, reduced adhesion and a tendency to crack. Counterbalancing this in part is the cohesiveness inherent in most condensation polymers due to the presence of dipole-dipole interaction (in this case the dipole associated with the carbonyl unit). The class of polymers in this invention possesses a flexible unit (FLU) to reduce the brittleness and improve other mechanical properties of the resultant polymer. The flexible units (FLU) in the charge transporting polymers of this invention are derived from the diacid chloride compound represented by the generic formula above. In diethylene glycol diacid chloride, triethylene glycol diacid chloride and trans-1,4-cyclohexylene diacid chloride-1,6-hexane, the presence of ether units and/or methylene units impart a substantial degree of flexibility because it possesses minimal hindrance to bond rotation. Generally, for those applications in which greater flexibility is required, polymers derived from diacid chlorides containing ether units and/or methylene units are preferred whereas for those applications in which greater hardness or creep resistance is required, polymers derived from diacid chlorides containing aromatic rings and/or double bond units are preferred. Thus, it is possible to tailor the physical properties to the intended use.

The following structures illustrate and compare polyester structures derived from diacid chlorides containing aromatic rings and/or double bond units with polyester structures derived from diacid chlorides containing ether units and/or methylene units. The rigid-rod units (RRU) of the arylamine moiety are represented by rectangles and rigid units associated with specific diacid chlorides are shown as crosshatched rectangles. The flexible units (FLU) derived from diacid chlorides are shown as springs.

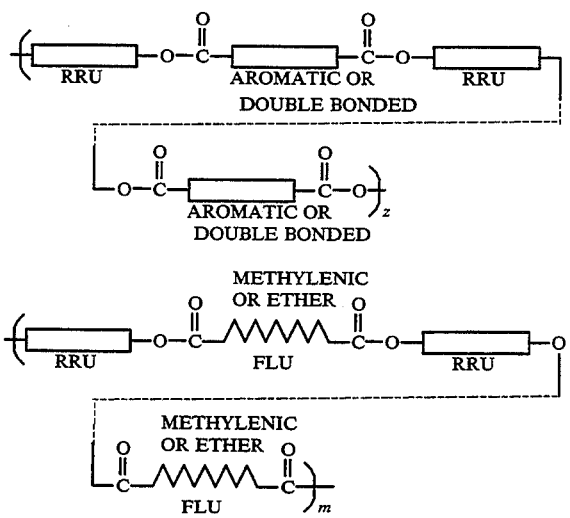

z and m are between about 5 and about 5,000. Thus, the flexible units (FLU) of the polymer of this invention reduce the brittleness and improve other mechanical properties such as tensile toughness whereas the modulus and hardness are increased with polymers derived from diacid chlorides containing aromatic rings and/or double bonds.

A photoconductive imaging member of this invention may be prepared by providing a substrate having an electrically conductive surface, applying a charge blocking layer on the electrically conductive surface, applying a charge generation layer on the blocking layer and applying a charge transport layer on the charge generation layer. If desired, the charge transport layer may be applied to the electrically conductive surface and the charge generation layer may thereafter be applied to the charge transport layer. The polymeric arylamine of this invention is present in at least the charge generation layer or the charge transport layer. When the photoconductive imaging member of this invention is employed in liquid development systems, the polymeric arylamine of this invention is preferably present in at least the outermost layer of the imaging member.

The substrate, electrically conductive surface, charge blocking layer, and optional adhesive layer are well know in the art of electrostatographic imaging and described, for example in U.S. Pat. No. 4,806,443, 4,806,444, 4,801,517 and 4,818,650, the entire disclosures of these patents being incorporated herein in their entirety.

Any suitable photogenerating layer may be applied to the blocking layer or intermediate layer if one is employed, which can then be overcoated with a contiguous hole transport layer as described. Examples of photogenerating layers include inorganic amorphous photoconductive films such as amorphous selenium, and selenium alloys selected from the group consisting of selenium-tellurium, selenium-tellurium-arsenic, selenium arsenide and mixtures thereof, inorganic photoconductive particles such as trigonal selenium, and organic photoconductive particles including various phthalocyanine pigment such as the X-form of metal free phthalocyanine described in U.S. Pat. No. 3,357,989, metal phthalocyanines such as vanadyl phthalocyanine and copper phthalocyanine, quinacridones available from DuPont under the trade name Monastral Red, Monastral violet and Monastral Red Y, Vat orange 1 and Vat orange 3 trade names for dibromo anthanthrone pigments, benzimidazole perylene, substituted 2,4-diamino-triazines disclosed in U.S. Pat. No. 3,442,781, polynuclear aromatic quinones available from Allied Chemical Corporation under the tradename Indofast Double Scarlet, Indofast Violet Lake B, Indofast Brilliant Scarlet and Indofast Orange, and the like dispersed in a film forming polymeric binder. Selenium, selenium alloy, benzimidazole perylene, and the like and mixtures thereof may be formed as a continuous, homogeneous photogenerating layer. Benzimidazole perylene compositions are well known and described, for example in U.S. Pat. No. 4,587,189, the entire disclosure thereof being incorporated herein by reference. Multi-photogenerating layer compositions may be utilized where a photoconductive layer enhances or reduces the properties of the photogenerating layer. Examples of this type of configuration are described in U.S. Pat. No. 4,415,639, the entire disclosure of this patent being incorporated herein by reference. Other suitable photogenerating materials known in the art may also be utilized, if desired. Charge generating binder layer comprising particles or layers comprising a photoconductive material such as vanadyl phthalocyanine, metal free phthalocyanine, benzimidazole perylene, amorphous selenium, trigonal selenium, selenium alloys such as selenium-tellurium, selenium-tellurium-arsenic, selenium arsenide, and the like and mixtures thereof are especially preferred because of their sensitivity to white light. Vanadyl phthalocyanine, metal free phthalocyanine and tellurium alloys are also preferred because these materials provide the additional benefit of being sensitive to infra-red light.

Numerous inactive resin materials may be employed in the photogenerating binder layer including those described, for example, in U.S. Pat. No. 3,121,006, the entire disclosure of which is incorporated herein by reference. Typical organic resinous binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amide-imide), styrene-butadiene copolymers, vinylidenechloride-vinylchloride copolymers, vinylacetate-vinylidenechloride copolymers, styrene-alkyd resins, and the like. These polymers may be block, random or alternating copolymers.

Active carrier transporting resin may also be employed as the binder in the photogenerating layer. These resins are particularly useful where the concentration of carrier generating pigment particles is low and the thickness of the carrier generation layer is substantially thicker than about 0.7 micrometer. The active resin commonly used as a binder is polyvinylcarbazole whose function is to transport carriers which would otherwise be trapped in the layer.

The electrically active polymeric amines of this invention can be employed in the generation layer replacing the polyvinylcarbazole binder or any other active or inactive binder. Thus, for example, all of the active resin materials to be employed in the generator layer may be replaced by the electrically active polymeric arylamines of this invention.

The photogenerating composition or pigment is present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition.

For embodiments in which the photogenerating layers do not contain a resinous binder, the photogenerating layer may comprise any suitable, well known homogeneous photogenerating material. Typical homogeneous photogenerating materials include inorganic photoconductive compounds such as amorphous selenium, selenium alloys selected such as selenium-tellurium, selenium-tellurium-arsenic, and selenium arsenide and organic materials such as vanadyl phthalocyanine, chlorindium phthalocyanine.

The photogenerating layer containing photoconductive compositions and/or pigments and the resinous binder material generally ranges in thickness of from about 0.1 micrometer to about 5 micrometers, and preferably has a thickness of from about 0.3 micrometer to about 3 micrometers. The photogenerating layer thickness is related to binder content. Higher binder content compositions generally require thicker layers for photogeneration. Thicknesses outside these ranges can be selected providing the objectives of the present invention are achieved.

The active charge transport layer comprises a polymeric aryl amine of this invention capable of supporting the injection of photogenerated holes from the charge generation layer and allowing the transport of these holes through the transport layer to selectively discharge the surface charge. When the photogenerating layer is sandwiched between the conductive layer and the active charge transport layer, the transport layer not only serves to transport holes, but also protects the photoconductive layer from abrasion or chemical attack and therefore extends the operating life of the electrophotographic imaging member. The charge transport layer should exhibit negligible, if any, discharge when exposed to a wavelength of light useful in xerography, e.g. 4000 angstroms to 9000 angstroms. Therefore, the charge transport layer is substantially transparent to radiation in a region in which the photoconductor is to be used. Thus, the active charge transport layer is a substantially non-photoconductive material which supports the injection of photogenerated holes from the generation layer. The active transport layer is normally transparent when exposure is effected through the active layer to ensure that most of the incident radiation is utilized by the underlying charge carrier generator layer for efficient photogeneration. When used with a transparent substrate, imagewise exposure may be accomplished through the substrate with all light passing through the substrate. In this case, the active transport material need not be transmitting in the wavelength region of use. The charge transport layer in conjunction with the generation layer in the instant invention is a material which is an insulator to the extent that an electrostatic charge placed on the transport layer is not conducted in the absence of illumination.

The transport material comprising a hole transporting small molecule-inactive resin binder composition may be entirely replaced with 100 percent of a polymeric arylamine compound of this invention. In addition, the binder used in a charge generating layer may be replaced with 100 percent of a polymeric arylamine compound of this invention. The use of a polymeric arylamine of this invention as the transport layer does not necessitate nor preclude the use of a polymeric arylamine, of this invention, as the binder in the charge generator layer. Additionally, its use as the charge generator layer binder does not necessitate nor preclude the use of a polymeric arylamine of this invention as the charge transport layer. When the polymeric arylamine of this invention is used as the active binder in the charge generator layer, it can be present in the range of between about 10 percent by volume and about 95 percent by volume, and preferably between about 20 percent by volume to about 30 percent by volume, the balance of which being made up of the photogenerating pigment. Any arylamine unit in the polymeric-hole transporting compound should be free from electron withdrawing substituents such as $NO_2$ groups, CN groups, $>C=O$ and the like which is directly bonded to the arylamine unit. The hole transporting small molecule-inactive resin binder composition may be entirely replaced with 100 percent of a polymeric arylamine compound of this invention.

Any suitable solvent may be employed to apply the transport layer material to the underlying layer. Typical solvents include methylene chloride, toluene, tetrahydrofuran, and the like. The selection of the solvent is determined in part by the coating method and the solvent characteristics of the other functional layers in the photoresponsive device. Methylene chloride solvent is a particularly desirable component of the charge transport layer coating mixture for adequate dissolution of all the components and for its low boiling point.

Any suitable and conventional technique may be utilized to mix and thereafter apply the charge transport layer coating mixture to the underlying surface, e.g. charge generating layer. Typical application techniques include spraying, dip coating, roll coating, wire wound rod coating, and the like. Drying of the deposited coating may be effected by any suitable conventional technique such as oven drying, infra-red radiation drying, air drying and the like.

Generally, the thickness of the hole transport layer is between about 5 to about 100 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

Optionally, an overcoat layer may also be utilized to improve resistance to abrasion. In some cases a back coating may be applied to the side opposite the photoreceptor to provide flatness and/or abrasion resistance. These overcoating and backcoating layers may comprise organic polymers or inorganic polymers that are electrically insulating or slightly semi-conductive.

The electrophotographic member of the present invention containing the electrically active polymeric arylamine in at least the generator or transport layer may be employed in any suitable and conventional electrophotographic imaging process which utilizes charging prior to imagewise exposure to activating electromagnetic radiation. Conventional positive or reversal development techniques may be employed to form a marking material image on the imaging surface of the electrophotographic imaging member of this invention. Thus, by applying a suitable electrical bias and selecting toner having the appropriate polarity of electrical charge, one may form a toner image in the negatively charged areas or discharged areas on the imaging surface of the electrophotographic member of the present invention. More specifically, for positive development, charged toner particles of one polarity are attracted to the oppositely charged electrostatic areas of the imaging surface and for reversal development, charged toner particles are attracted to the discharged areas of the imaging surface. Where the transport layer of this invention is sandwiched between a photogenerating layer and a conductive surface, a positive polarity charge is normally applied prior to imagewise exposure to activating electromagnetic radiation. Where the photogenerating layer is sandwiched between a transport layer and a conductive surface, a negative polarity charge is normally applied prior to imagewise exposure to activating electromagnetic radiation. As is well known in the art, the conductive layer may be omitted and the opposite sides of the generator and transport layer assembly may be simultaneously charged with charges of opposite polarity to achieve the equivalent effect of a conductive layer.

The electrophotographic member of the present invention exhibits greater resistance to cracking, crazing, crystallization of arylamine compounds, phase separation of arylamine compounds and leaching of arylamine compounds during cycling if exposed to a xerographic liquid developer.

The invention will now be described in detail with respect to the specific preferred embodiments thereof, it being understood that these examples are intended to be illustrative only and that the invention is not intended to be limited to the materials, conditions, process parameters and the like recited herein. All parts and percentages are by weight unless otherwise indicated.

EXAMPLE I

Into a 250 milliliter three-necked round bottom flask equipped with a mechanical stirrer, an argon gas inlet, a thermometer and a dropping funnel was placed 10.4 grams N,N'-diphenyl N,N'-bis-(3-hydroxyphenyl)-[1,1'biphenyl]4,4'-diamine (0.02 mole), 100 milliliters tetrahydrofuran and 8.4 milliliters triethylamine (0.06 mole). The contents of the flask were cooled with a water bath and the temperature was maintained at 15° C. throughout the dropwise addition of 3.6 milliliters double distilled suberoyl chloride (0.02 mole) dissolved in 50 milliliters tetrahydrofuran. A colorless precipitate of triethylamine hydrochloride formed after approximately 5 drops of acid chloride solution had been added. After 60 minutes, the addition was complete and the viscous mixture allowed to stir for 15 minutes. The polymer solution was filtered to remove the triethylamine hydrochloride. The colorless polymer solution was precipitated into methanol, filtered and dried. Yield was 12.1 grams MW 66,000.

Purification: In a 250 milliliter Edenmeyer flask, 10 grams of crude polymer was mixed with 100 milliliters tetrahydrofuran. The mixture was agitated with a magnetic stirrer until the polymer was completely dissolved. While stirring was maintained, 4 grams F-20 alumina (Alcoa) was added. After 90 minutes, the polymer solution was filtered, precipitated into methanol and dried. Yield was 9.7 grams.

EXAMPLE II

Into a 250 milliliter three-necked round bottom flask equipped with a mechanical stirrer, an argon gas inlet, a thermometer and a dropping funnel was placed 10.4 grams N,N'-diphenyl N,N'-bis-(3-hydroxyphenyl)-[1,1'biphenyl]4,4'-diamine (0.02 mole), 100 milliliters tetrahydrofuran and 8.4 milliliters triethylamine (0.06 mole). The contents of the flask were cooled with a water bath and the temperature was maintained at 15° C. throughout the dropwise addition of 4.9 milliliters double distilled azelaoyl chloride (0.02 mole) dissolved in 50 milliliters tetrahydrofuran. A colorless precipitate of triethylamine hydrochloride formed after approximately 5 drops of acid chloride solution had been added. After 60 minutes, the addition was complete and the viscous mixture was allowed to stir for 15 minutes. The polymer solution was filtered to remove the triethylamine hydrochloride. The colorless polymer solution was precipitated into methanol, filtered and dried. Yield was 12.0 grams MW 67,000.

Purification: In a 250 milliliter Erlenmeyer flask, 10 grams of crude polymer was mixed with 100 milliliters tetrahydrofuran. The mixture was agitated with a magnetic stirrer until the polymer was completely dissolved. While stirring was maintained, 4 grams F-20 alumina (Alcoa) was added. After 90 minutes, the polymer solution was filtered, precipitated into methanol and dried. Yield was 9.7grams.

EXAMPLE III

Into a 250 milliliter three-necked round bottom flask equipped with a mechanical stirrer, an argon gas inlet, a thermometer and a dropping funnel was placed 15.6 grams N,N'-diphenyl N,N'-bis-(3-hydroxyphenyl)-[1,1'biphenyl]4,4'-diamine (0.03 mole), 100 milliliters tetrahydrofuran and 12.6 milli liters triethylamine (0.09 mole). The contents of the flask were cooled with a water bath and the temperature was maintained at 15° C. throughout the dropwise addition of 6.4 milliliters double distilled sebacoyl chloride (0.03 mole) dissolved in 50 milliliters tetrahydrofuran. A colorless precipitate of triethylamine hydrochloride formed after approximately 5 drops of acid chloride solution had been added. After 60 minutes, the addition was complete and the viscous mixture allowed to stir for 15 minutes. The polymer solution was filtered to remove the triethylamine hydrochloride. The colorless polymer solution was precipitated into methanol, filtered and dried. Yield was 19.3 grams, MW 103,000.

Purification: In a 250 milliliter Edenmeyer flask, 10 grams of crude polymer was mixed with 100 milliliters tetrahydrofuran. The mixture was agitated with a magnetic stirrer until the polymer was completely dissolved. While stirring was maintained, 4 grams F-20 alumina (Alcoa) was added. After 90 minutes, the polymer solution was filtered, precipitated into methanol and dried. Yield was 9.7grams.

EXAMPLE IV

Into a 250 milliliter three-necked round bottom flask equipped with a mechanical stirrer, an argon gas inlet, a thermometer and a dropping funnel was placed 15.6 grams N,N'-diphenyl N,N'-bis-(3-hydroxyphenyl)-[1,1'biphenyl]4,4'-diamine (0.03 mole), 100 milliliters tetrahydrofuran and 12.6 milliliters triethylamine (0.09 mole). The contents of the flask were cooled with a water bath and the temperature was maintained at 15° C. throughout the dropwise addition of 7.5 milliliters double distilled dodecyloyl chloride (0.03 mole) dissolved in 50 milliliters tetrahydrofuran. A colorless precipitate of triethylamine hydrochloride formed after approximately 5 drops of acid chloride solution had been added. After 60 minutes, the addition was complete and the viscous mixture allowed to stir for 15 minutes. The polymer solution was filtered to remove the triethylamine hydrochloride. The colorless polymer solution was precipitated into methanol, filtered and dried. Yield was 19.6 grams, MW 110,000.

Purification: In a 250 milliliter Erlenmeyer flask, 10 grams of crude polymer was mixed with 100 milliliters tetrahydrofuran. The mixture was agitated with a magnetic stirrer until the polymer was completely dissolved. While stirring was maintained, 4 grams F-20 alumina (Alcoa) was added. After 90 minutes, the polymer solution was filtered, precipitated into methanol and dried. Yield was 9.7grams.

EXAMPLE V

Preparation of a photosensitive member utilizing a polymer of this invention:

An epoxy phenolic barrier layer about 0.5 micrometer thick was formed on a 3 rail aluminum substrate by dip coating. A 1 micrometer thick layer of amorphous selenium was the vacuum evaporated on the coated aluminum substrate by a conventional vacuum deposition technique such as the technique disclosed in Bixby in U.S. Pat. Nos. 2,753,278 and 2,970,906.

This vacuum deposition was carried out at a vacuum of $10^{-6}$ Torr while the substrate was maintained at a temperature of about 50° C. during the vacuum deposition. A charge transport layer was prepared by dissolving 10 milliliters of tetrahydrofuran and 1.5 grams of the polymer, as prepared in Example III. A layer of this mixture was formed on the amorphous selenium layer using a Bird film applicator. The coating was then vacuum dried a 40° C. for 18 hours to form a 22 micrometer thick dry layer of the charge transport polymer. The plate was tested for its photoconductive property by first negatively corona charging to a field of 50 volts/micrometer and exposing to a blue light flash of 4330 Angstrom wavelength, 2 microseconds duration and 25 ergs/cm² light intensity. The device discharged to a very low potential of less than 50 volts indicating good photoconductive properties.

EXAMPLE VI

A charge transport layer is prepared by dissolving 10 milliliters of tetrahydrofuran and 1.5 grams of the polymer, as prepared in Example II. A layer of this mixture is formed, on an aluminum substrate having thereon a 0.2 micrometer As₂Se₃ layer, using a Bird film applicator. The coating is then vacuum dried at 100° C. for one hour to form a 22 micrometer thick dry layer of the charge transporting polyester. The plate is tested for its photoconductive property by first negatively corona charging to a field of 50 volts/micron and exposing to a blue light flash of 4330 Angstrom wavelength, 2 microseconds duration, and 25 erg/cm² light intensity. The device is expected to discharge to a very low potential of less than 50 volts which would indicate good photoconductive properties. The member is then subjected to a cyclic operation of charge expose and erase cycles in a scanner, and is expected to be stable even after 20,000 cycles of essentially continuous operation.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. An electrostatographic imaging member comprising a support layer, at least one charge generating layer and a charge transport layer, at least said charge generating layer or said charge transport layer comprising a polyarylamine polymer represented by the formula:

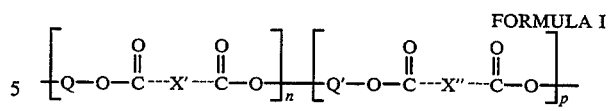

FORMULA I wherein:

n is between about 5 and about 5,000 p is between about 0 and about 5,000

X' and X" are a biradical independently selected from the group consisting of alkylene, arylene, substituted alkylene, substituted arylene and ether linkages represented by —R—O—R— where R is an alkylene moiety of 1-25 carbon atoms optionally interrupted by ether oxygens, Q is a divalent group derived from a hydroxy terminated arylamine reactant containing the group:

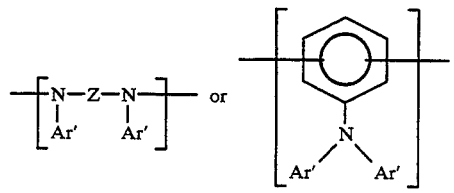

wherein:

Ar' is selected from the group consisting of:

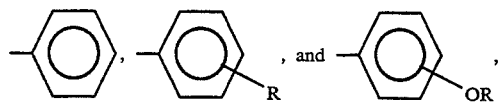

Z is selected from the group consisting of:

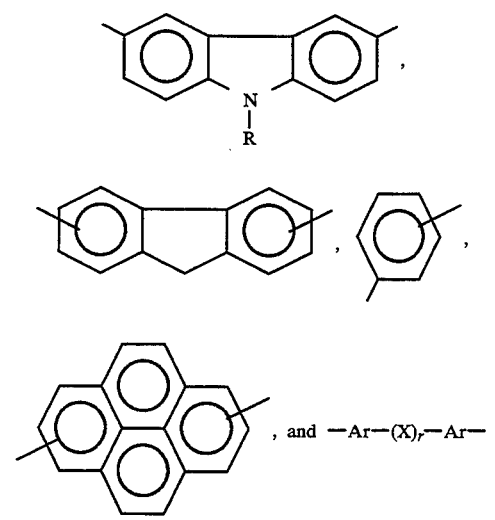

r is 0 or 1,

Ar is selected from the group consisting of:

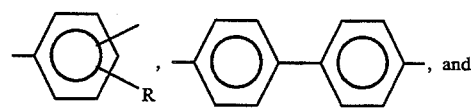

-continued

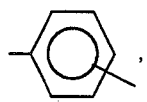

R is selected from the group consisting of —CH₃, —C₂H₅, —C₃H₇, and —C₄H₉,

X is selected from the group consisting of:

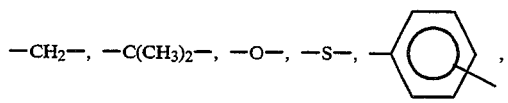

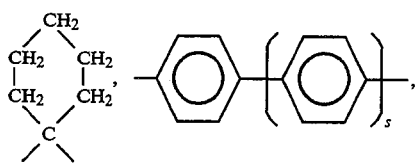

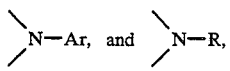

s is 0, 1 or 2,

Q' is a divalent group derived from a hydroxy terminated group, and the weight average molecular weight of the polyarylamine polymer is between about 10,000 and about 1,000,000.

2. An electrostatographic imaging member according to claim 1 wherein said charge generating layer is between said support layer and said charge transport layer.

3. An electrostatographic imaging member according to claim 2 wherein said charge transport layer comprises said polyarylamine polymer.

4. An electrostatographic imaging member according to claim 2 wherein said charge generating layer comprises said polyarylamine polymer.

5. An electrostatographic imaging member according to claim 2 wherein both said charge transport layer and charge generator layer comprise said polyarylamine polymer and said charge generator layer also comprises a photogenerating pigment.

6. An electrostatographic imaging member according to claim 2 wherein said imaging member comprises a blocking layer between said charge generating layer an said support layer.

7. An electrostatographic imaging member according to claim 2 wherein said imaging member comprises a protective overcoating comprising said polyarylamine polymer.

8. An electrostatographic imaging member according to claim 1 wherein said polyarylamine polymer is represented by the formula:

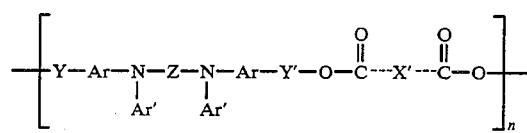

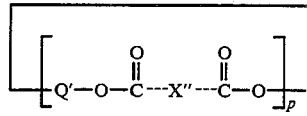

wherein:

n is between about 5 and about 5,000, p is between about 0 and about 5,000,

Z is selected from the group consisting of:

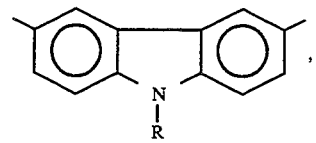

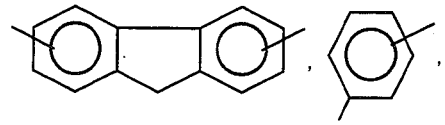

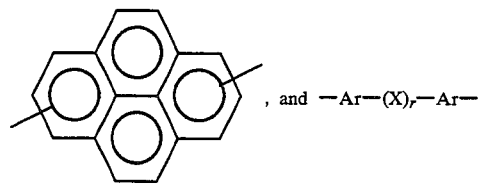

r is 0 or 1,

Ar is selected from the group consisting of:

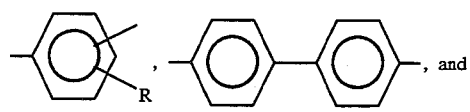

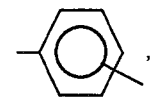

R is selected from the group consisting of —CH₃, —C₂H₅, —C₃H₇, and —C₄H₉,

X is selected from the group consisting of:

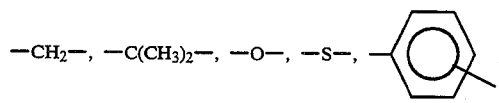

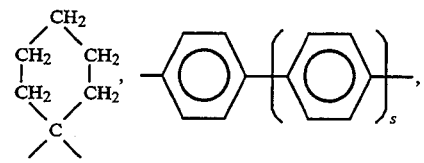

-continued

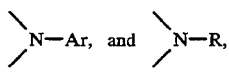

S is 0, 1 or 2,
Ar' is selected from the group consisting of:

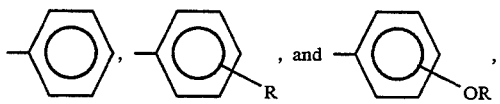

X' AND X" are a biradical independently selected from the group consisting of alkylene, arylene, substituted alkylene, substituted arylene and ether linkages represented by —R—O—R— where R is an alkylene moiety of 1–25 carbon atoms optionally interrupted by ether oxygens, Y and Y' are independently selected from a group represented by the formula:

t is 0, 1, 2, 3, or 4, and
Q' is independently selected from the group having bifunctional linkages consisting of:

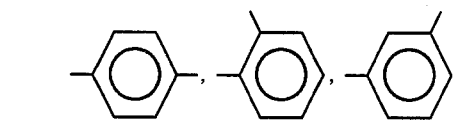

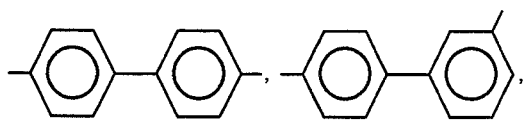

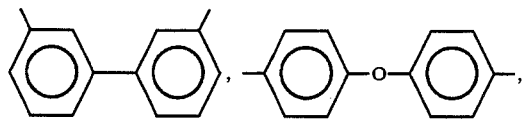

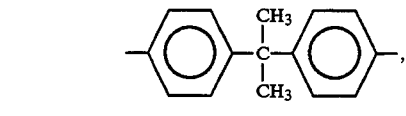

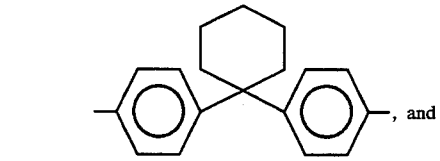

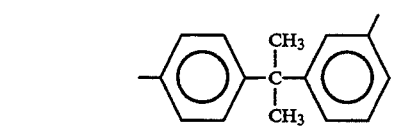

9. An electrostatographic imaging member according to claim 1 wherein said polyarylamine polymer is the reaction product of a dihydroxy arylamine compound and a co-reactant di-acidchloride compound represented by the formula:

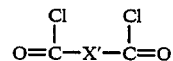

wherein X' is a biradical selected from the group consisting of alkylene, arylene, substituted alkylene, substituted arylene and ether linkages having only carbon termination containing from 1 to 25 carbon atoms,

10. An electrostatographic imaging member according to claim 9 wherein an additional dihydroxy compound is included in said reaction, said additional dihydroxy compound being selected from the group consisting of:

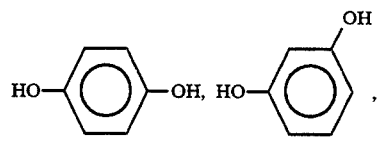

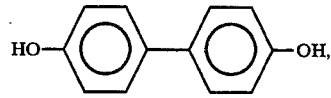

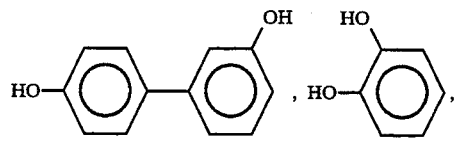

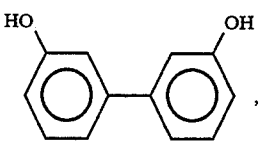

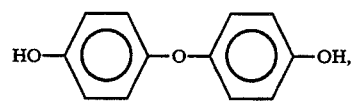

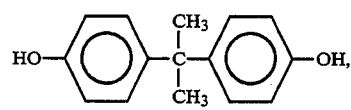

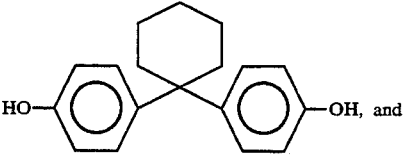

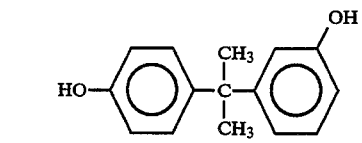

11. An electrostatographic imaging member according to claim 10 wherein said hydroxy group terminated monomer produces a weight average molecular weight polymer of between about 50,000 and about 500,000.

12. An electrophotographic imaging process comprising forming an electrostatic latent image on the imaging surface of an electrostatographic imaging member comprising a support layer, at least one charge generating layer and a charge transport layer, at least said charge generating layer or said charge transport layer comprising a polyarylamine polymer represented by the formula:

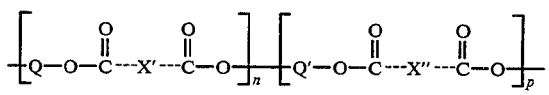

wherein:
n is between about 5 and about 5,000
p is between about 0 and about 5,000
X' and X" are a biradical independently selected from the group consisting of alkylene, arylene, substituted alkylene, substituted arylene and ether linkages represented by —R—O—R— where R is an alkylene moiety of 1-25 carbon atoms optionally interrupted by ether oxygens,
Q is a divalent group derived from a hydroxy terminated arylamine reactant containing the group:

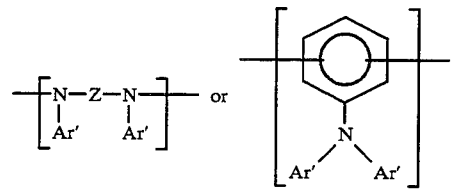

wherein:
Ar' is selected from the group consisting of:

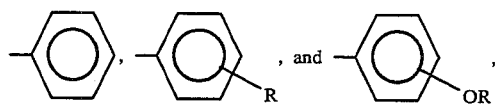

Z is selected from the group consisting of:

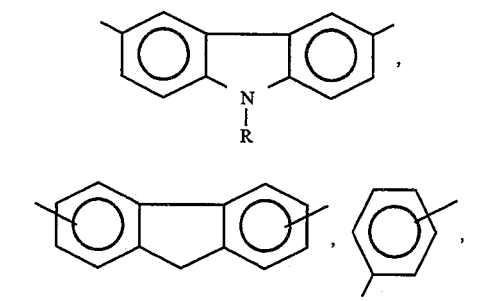

r is 0 or 1,
Ar is selected from the group consisting of:

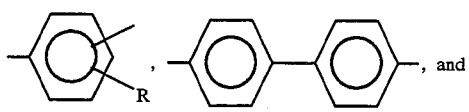

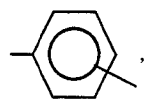

R is selected from the group consisting of —CH₃, —C₂H₅, —C₃H₇, and —C₄H₉,

X is selected from the group consisting of:

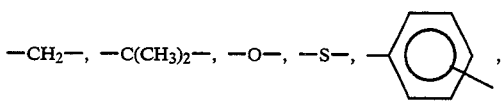

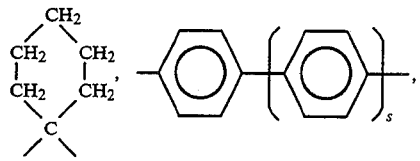

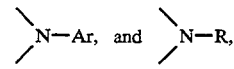

s is 0, 1 or 2,
Q' is a divalent group derived from a hydroxy terminated group, and
the weight average molecular weight of the polyarylamine polymer is between about 10,000 and about 1,000,000, and contacting said imaging surface with a developer comprising electrostatically attractable marking particles whereby said electrostatically attractable marking particles deposit on said imaging surface in conformance with said electrostatic latent image to form a marking particle image.

13. An electrophotographic imaging process according to claim 12 wherein said developer is a liquid developer.

14. An electrophotographic imaging process according to claim 13 wherein said liquid developer comprises an organic carrier fluid.

15. An electrophotographic imaging process according to claim 12 including transfering said marking particle deposit to a receiving member.

16. An electrophotographic imaging process according to claim 15 including repeating said forming, contacting and transfering steps at least once.

17. An electrophotographic imaging process according to claim 12 wherein said imaging member comprises a charge generating layer and a charge transport layer comprising said polyarylamine polymer, said charge transport layer being substantially transparent to radiation in the region in which said imaging member is exposed during electrophotographic imaging and capable of supporting the injection of photo-generated holes from said charge generating layer and transporting said holes through said charge transport layer to selectively discharge an electrostatic charge on said imaging surface to form said electrostatic latent image.

18. An electrophotographic imaging process according to claim 12 wherein said polyarylamine polymer is represented by the formula:

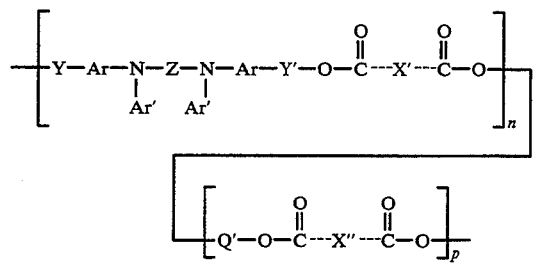

wherein:
n is between about 5 and about 5,000.
p is between about 0 and about 5,000.
Z is selected from the group consisting of:

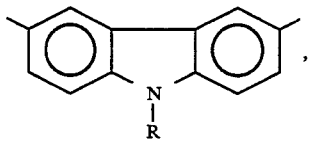

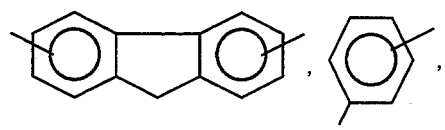

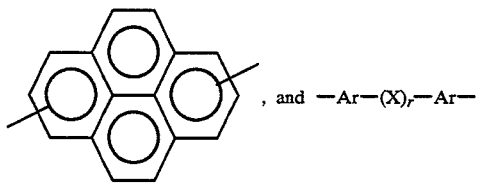

r is 0 or 1,
Ar is selected from the group consisting of:

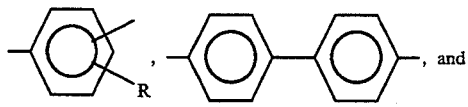

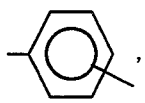

R is selected from the group consisting of —CH$_3$, —C$_2$H$_5$, —C$_3$H$_7$, and —C$_4$H$_9$,
X is selected from the group consisting of:

—CH$_2$—, —C(CH$_3$)$_2$—, —O—, —S—, 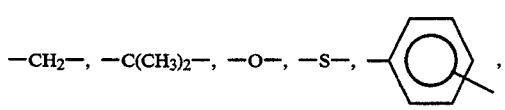

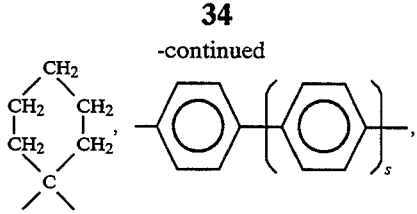

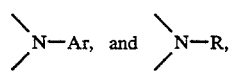

s is 0, 1 or 2,
Ar' is selected from the group consisting of:

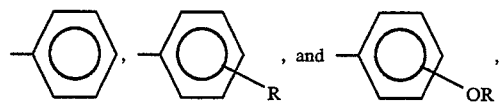

X' AND X" are a biradical independently selected from the group consisting of alkylene, arylene, substituted alkylene, substituted arylene and ether linkages represented by —R—O—R— where R is an alkylene moiety of 1–25 carbon atoms optionally interrupted by ether oxygens, and
Y and Y' are independently selected from a group represented by the formula:

t is 0, 1, 2, 3, or 4
Q' is independently selected from a group having bifunctional linkages:

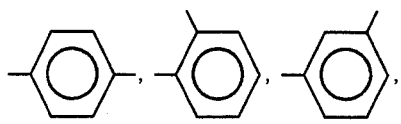

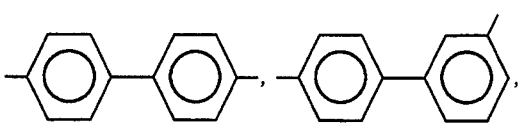

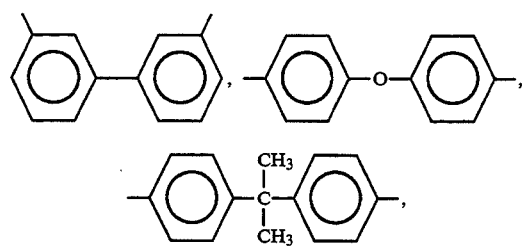

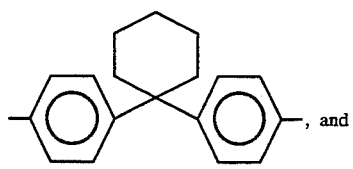

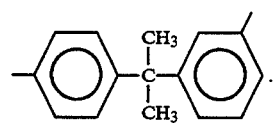

* * * * *